(12) United States Patent
Easterling et al.

(10) Patent No.: US 10,838,747 B2
(45) Date of Patent: Nov. 17, 2020

(54) VIRTUAL APPLIANCES

(71) Applicant: HEWLETT PACKARD ENTERPRISE DEVELOPMENT LP, Houston, TX (US)

(72) Inventors: Tyler Easterling, Ft. Collins, CO (US); Kyle Meyer Byerly, Ft. Collins, CO (US); Michael A. Scheetz, Ft. Collins, CO (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 262 days.

(21) Appl. No.: 15/842,779

(22) Filed: Dec. 14, 2017

(65) Prior Publication Data
US 2019/0188014 A1 Jun. 20, 2019

(51) Int. Cl.
*G06F 9/455* (2018.01)
*G06F 9/54* (2006.01)

(52) U.S. Cl.
CPC .......... *G06F 9/455* (2013.01); *G06F 9/45533* (2013.01); *G06F 9/45541* (2013.01); *G06F 9/54* (2013.01); *G06F 2009/45562* (2013.01)

(58) Field of Classification Search
CPC ....... H04L 41/0803; G06F 9/54; G06F 9/455; G06F 9/45541; G06F 9/45533; G06F 2009/45562
See application file for complete search history.

(56) References Cited

U.S. PATENT DOCUMENTS

| 8,239,509 | B2 * | 8/2012 | Ferris | G06F 15/177 709/223 |
|---|---|---|---|---|
| 8,745,205 | B2 | 6/2014 | Anderson et al. | |
| 8,931,038 | B2 | 1/2015 | Pulier et al. | |
| 9,612,815 | B1 * | 4/2017 | Jagtap | G06F 8/61 |
| 9,983,860 | B1 * | 5/2018 | Koty | H04L 67/10 |
| 2006/0112247 | A1 * | 5/2006 | Ramany | G06F 3/0605 711/165 |

(Continued)

OTHER PUBLICATIONS

Cisco, "Cisco Application Centric Infrastructure Data Sheet," Jan. 19, 2017, pp. 1-19 [online], Document ID: 1461192024945517, Retrieved from the Internet on May 18, 2017 at URL: <cisco.com/c/en/us/products/collateral/cloud-systems-management/application-policy-infrastructure-controller-apic/datasheet-c78-732414.html>.

(Continued)

*Primary Examiner* — Duy Khuong T Nguyen
*Assistant Examiner* — Kevin X Lu
(74) *Attorney, Agent, or Firm* — Hewlett Packard Enterprise Patent Department

(57) ABSTRACT

Example implementations relate to virtual appliances. In an example, a processor-based appliance abstraction engine exposes a programming interface for accessing undifferentiated resources of a computing environment irrespective of the type of the computing environment. Computing environment types may include physical infrastructure, virtual infrastructure, or cloud infrastructure. The appliance abstraction engine discovers available resources of the computing environment and creates a virtual appliance by configuring the discovered available resources of the computing environment according to capabilities defined in a specification and by populating the computing environment with artifacts for a computing platform defined in the specification.

23 Claims, 5 Drawing Sheets

(56) References Cited

U.S. PATENT DOCUMENTS

| | | | | |
|---|---|---|---|---|
| 2010/0131649 | A1* | 5/2010 | Ferris | G06F 9/4856 |
| | | | | 709/226 |
| 2011/0239268 | A1* | 9/2011 | Sharp | G06F 9/45558 |
| | | | | 726/1 |
| 2017/0003956 | A1* | 1/2017 | Chang | G06F 8/654 |
| 2017/0324813 | A1* | 11/2017 | Jain | H04L 41/5009 |
| 2018/0145886 | A1* | 5/2018 | Rao | H04L 41/12 |
| 2019/0028331 | A1* | 1/2019 | Kovacheva | H04L 41/082 |
| 2019/0028355 | A1* | 1/2019 | Subramanian | H04L 41/12 |
| 2019/0140895 | A1* | 5/2019 | Ennis, Jr. | G06F 9/54 |

OTHER PUBLICATIONS

Demetris Trihinas et al., "JCatascopia: Monitoring Elastically Adaptive Applications in the Cloud," Feb. 27, 2014, pp. 1-10, University of Cyprus.

Hashicorp, "Introduction to Terraform," 2017, pp. 1-2 [online], Retrieved from the Internet on Dec. 14, 2017 at URL: <terraform.io/intro/index.html>.

Mike Leone, "VMware Cloud Management Solutions," Jul. 22, 2013, pp. 1-9 [online], The Enterprise Strategy Group, Retrieved from the Internet on May 18, 2017 at URL: <www3.esg-global.com/lab-reports/vmware-cloud-management-solutions/>.

* cited by examiner

VIRTUAL APPLIANCES

BACKGROUND

Computer software can be a set of instructions executable in a computing environment. Some computer software, when executed, may provide a computing platform on a computing environment. A computing platform, among other things, may be a framework on which other software run and may abstract functionality and capabilities of the computing environment for other software.

BRIEF DESCRIPTION OF THE DRAWINGS

Various examples will be described below with reference to the following figures.

DETAILED DESCRIPTION

Different types of computing environments exist, such as physical infrastructure, virtual infrastructure, and cloud infrastructure. Physical infrastructure may refer to, for example a distinct piece of physical hardware, such as a bare metal server. Virtual infrastructure may include a system where a hypervisor runs on physical infrastructure, and the hypervisor creates and runs virtual machines. Cloud infrastructure may include a public cloud, where pools of data center resources are made available over a network for public use (either free, by purchase or lease, or through other arrangements). Other types of cloud infrastructure include private clouds, hybrid clouds, etc.

Although the different types of computing environments are similar in that they may all provide compute, storage, and/or networking resources in some form, managing and using the different types of computing environments may be different in many respects. For example, virtual and cloud infrastructure may automate, hide, or abstract away much of the configuration involved in operating physical infrastructure. In particular, deploying and managing a given computing platform (i.e., a software-based computing platform) on different environments or even variations of a same environment may involve the use of different tooling and structure in many cases, thus leading to costly duplication of effort and/or involving user expertise. Some solutions offer mixed control surfaces that are not unified across different environment types or require manual intervention.

Thus, it may be useful to provide consolidated management across cloud, virtual, and physical environment deployments. Examples disclosed herein may relate to, among other things, a processor-based appliance abstraction engine. In some implementations, the appliance abstraction engine may be called via a programming interface to access undifferentiated resources of a computing environment irrespective of the type of the computing environment. The appliance abstraction engine discovers available resources of the computing environment automatically. The appliance abstraction engine creates a virtual appliance by configuring the discovered available resources of the computing environment according to capabilities defined in a specification and by populating the computing environment with artifacts for a computing platform defined in the specification.

By virtue of an appliance abstraction engine, platforms may be deployed and maintained on different types of computing environments (e.g., physical, virtual, cloud) without knowledge or understanding of the type of the environment and in a highly automated manner. The appliance abstraction engine facilitates consistent architecture across hybrid deployments (e.g., between traditional data center servers and cloud, or among different cloud providers), simplified development environment setup, and simplified gate testing owing to reproducible virtual appliance deployments.

Figure 1:
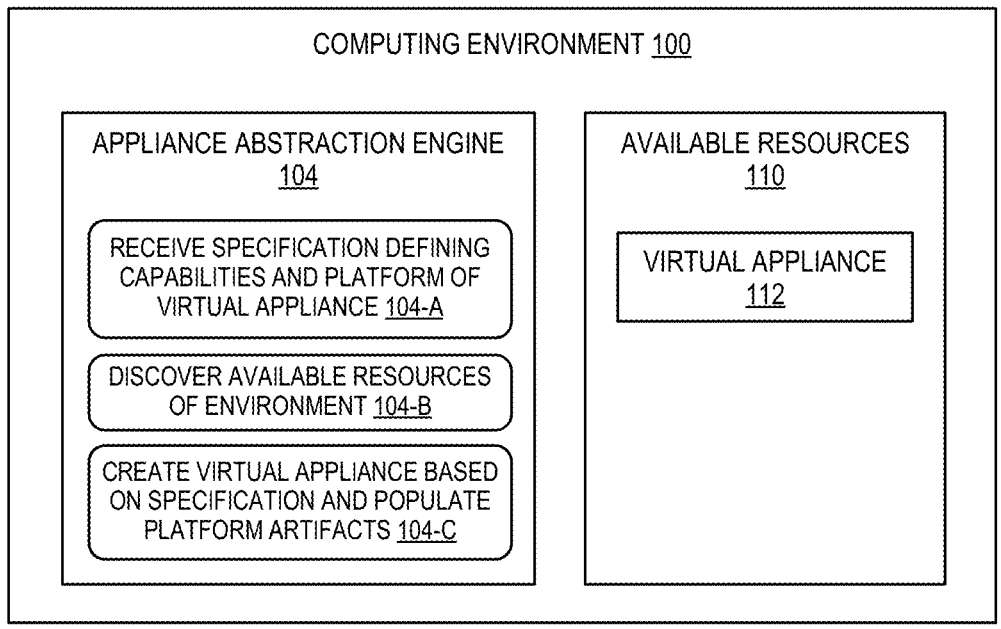
FIG. 1 is a block diagram depicting an example system that creates a virtual appliance.

Referring now to the figures, FIG. 1 is a block diagram depicting an example system that creates a virtual appliance. The system may include a computing environment 100, the typing of which is physical infrastructure (e.g., a bare metal server), virtual infrastructure (e.g., a virtual machine environment), or cloud infrastructure (e.g., a public cloud service). Other types of infrastructure may also serve as computing environment 100. The computing environment 100 includes a hardware processor, which may be abstracted into a computing resource in the case of virtual infrastructure or cloud infrastructure.

The system also includes an appliance abstraction engine 104 deployed on the computing environment. The appliance abstraction engine 104 may be any combination of hardware and programming to implement the functionalities described herein (i.e., 104-A, 104-B, 104-C described below). In some implementations, the programming may be processor executable instructions stored on a non-transitory machine-readable storage medium, and the hardware may include at least one processing resource to retrieve and/or execute those instructions. Example processing resources include a microcontroller, a microprocessor, central processing unit core(s), an application-specific integrated circuit (ASIC), a field programmable gate array (FPGA), etc. Example non-transitory machine readable medium include random access memory (RAM), read-only memory (ROM), electrically erasable programmable read-only memory (EEPROM), flash memory, a hard disk drive, etc. The term "non-transitory" does not encompass transitory propagating signals. Additionally or alternatively, the appliance abstraction engine 104 may include electronic circuitry or logic for implementing functionality described herein. In an example, the hardware (processing resource, circuitry, machine readable medium) is that of the computing environment 100, such that the appliance abstraction engine 104 is running or executing within the computing environment 100.

The appliance abstraction engine 104 exposes a programming interface (i.e., an application programming interface, or API) for accessing undifferentiated resources of the computing environment 100, irrespective of the type of the computing environment 100. In other words, a caller, such as an application, a program, a script, a user interface, or other software, may call the programming interface of the appliance abstraction engine 104 to access and manage resources of the computing environment 100 without the caller having knowledge or understanding of the type of the computing environment 100. In particular, the caller may call the programming interface to perform deployments into the computing environment 100 such as deployments of computing platforms, without knowledge or understanding of the type of the computing environment 100. As will be described below, the appliance abstraction engine 104 facilitates access to undifferentiated resources by deploying on the computing environment 100 a virtual appliance 112 to be utilized for the caller.

The appliance abstraction engine 104 receives 104-A a specification that defines the capabilities of the virtual appliance and defines the computing platform(s) to be executed on the virtual appliance. The specification may be passed to the appliance abstraction engine 104 by the caller, may be retrieved by the appliance abstraction engine 104 from a specification repository storing preconfigured specifications, or may be delivered to or retrieved by the appliance abstraction engine 104 in other ways.

The computing platform defined by the specification may be any type of software or platform, such as a cluster management platform (e.g., Apache Mesos), a container management platform (e.g., Kubernetes), a storage management platform (e.g., Ceph), a cloud platform (e.g., OpenStack), etc. The specification may also include a version indicator of the platform or other platform configuration details.

The capabilities of the virtual appliance defined by the specification may refer to desired capabilities related to operation of the computing platform. In other words, the specification may be deemed in some examples to define a minimum resource envelope needed to support the computing platform to be deployed on the computing environment 100. For example, the capabilities may include minimum firmware levels for supporting the computing platform. Another example of specified capabilities includes network fabric initialization parameters, or in other words, what the desired network topology looks like. Another example specified capability may relate to storage initialization parameters (e.g., for standing up a storage-type computing platform), such as whether the virtual appliance should have block level storage, file level storage, object storage, etc., and/or what storage access protocol to utilize. The capabilities may also include high availability parameters, such as node configuration, fault tolerance, etc. In general, the capabilities defined in the specification need not be written in terms of the underlying infrastructure type of the computing environment 100, thus enabling a caller to deploy to any type of computing environment 100.

The appliance abstraction engine 104 may discover 104-B available resources 110 of the computing environment 100 utilizing discovery tools included in the appliance abstraction engine 104 for discovering available resources of physical, virtual, and cloud infrastructure types. In some implementations, the appliance abstraction engine 104 receives a one-time hint about what infrastructure type the computing environment 100 is when the appliance abstraction engine 104 is first deployed and initialized on the computing environment 100. Thereafter, the appliance abstraction engine 104 can automatically interrogate and discover the available resources 110 using the appropriate discovery tools for the type of the computing environment 100 without manual intervention. The appliance abstraction engine 104 may keep an inventory of the available resources 110. Available resources 110 may refer to compute resources (e.g., processor and/or memory), network resources, storage resources, or other types of resource. Discovery may also include determining a control point of the computing environment 100 by which to manipulate an available resource. Examples of resource discovery will be described below with reference to FIGS. 2A, 2B, and 2C.

Once the appliance abstraction engine 104 has discovered the available resources 110 of the computing environment 100, the appliance abstraction engine 104 can create 104-C the virtual appliance 112 by configuring the discovered available resources 110 of the computing environment according to the capabilities defined in the specification and by populating the computing environment with artifacts for the computing platform defined in the specification. For example, the appliance abstraction engine 104 may manipulate or reserve resources of the computing environment 100 to match the capabilities in the specification. The appliance abstraction engine 104 may track in its inventory the portion of available resources 110 that are allocated to the virtual appliance 112. If the available resources 110 are insufficient to satisfy the capabilities of the specification, the appliance abstraction engine 104 may return an error to the caller.

In some cases, resource discovery by the appliance abstraction engine 104 generates more low level detail for physical infrastructure environments than for virtual or cloud infrastructure environments, in part because virtual and cloud infrastructures already provide some abstraction. However, by virtue of the appliance abstraction engine 104 being equipped to automatically discover resources irrespective of the type of environment, complexity of deploying into different environments is reduced and may be abstracted to a very high degree.

Artifacts for the computing platform populated to the virtual appliance 112 may include, for example, operating system image(s), a configuration file(s), and/or other files for initializing and operating the platform. In some implementations, the process of starting up the computing platform using the artifacts may be handled by another component, such as a cooperative self-assembling system. In some implementations, the appliance abstraction engine 104 populates the artifacts from an external repository.

Once deployed, the virtual appliance 112 on the computing environment 100, will appear identical regardless of the underlying infrastructure type of the computing environment 100. Thus, the actions of a caller and the computing platform may be simplified and abstracted away from knowledge of that underlying infrastructure type.

In some implementations, the computing platform running on the virtual appliance 112 may make a request (e.g. API call) to the appliance abstraction engine 104 to modify the virtual appliance 112. For example, the computing platform may request modification of the resources available to the computing platform itself. Such a request may be deemed a specific request, because it identifies a specific existing virtual appliance to be acted on by the appliance abstraction engine 104. By comparison, a request to create a virtual appliance in the first instance may be deemed a generic request. The modifications may relate to one or more of the capabilities specified in the specification. The appliance abstraction engine can discover (104-B) available resources again and/or check the tracked inventory, and modify the virtual appliance 112 according to the request.

In some implementations, the appliance abstraction engine 104 may receive or retrieve updates to platform artifacts, and in turn may provide them to the virtual appliance 112. A lifecycle management component may then update the computing platform accordingly. For example, the lifecycle management component may be part of the computing platform itself or may be part of the component that managed starting up the computing platform (e.g., the self-assembling system referenced above) or may be an independent component.

In some implementations, the appliance abstraction engine 104 may periodically scrub the inventory to determine whether some of the computing environment resources allocated to a virtual appliance are no longer in use by any virtual appliances or computing platforms and may release those unused resources back to the available resources 110 pool (e.g., as tracked in the inventory).

Figure 2A:
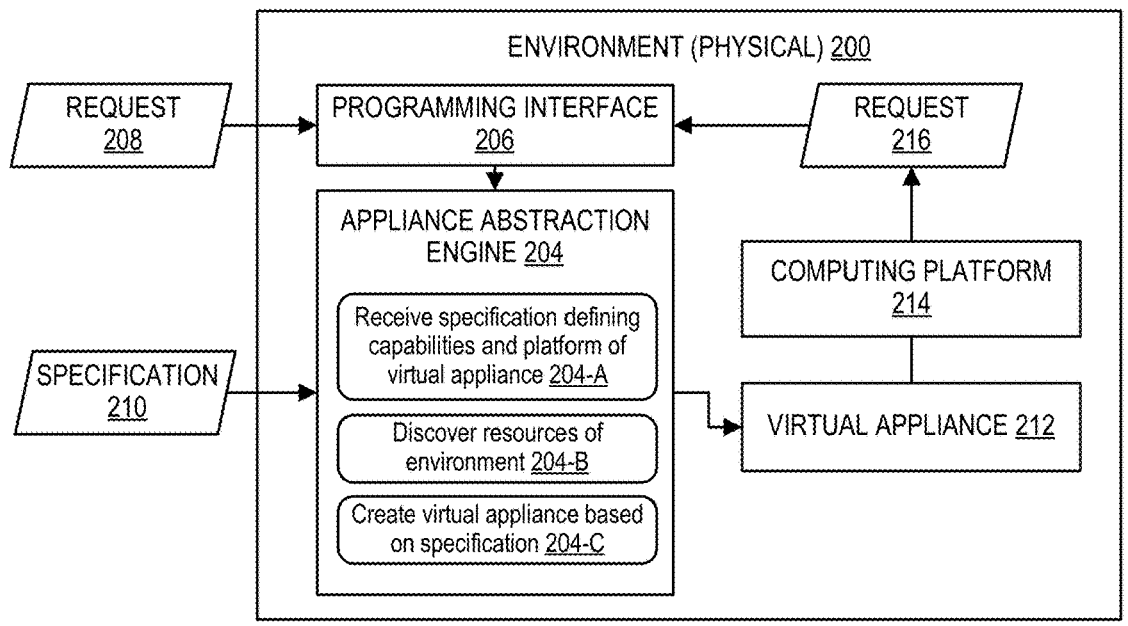
FIG. 2A is a block diagram depicting an example system that creates a virtual appliance in a physical infrastructure type of environment.
Figure 2B:
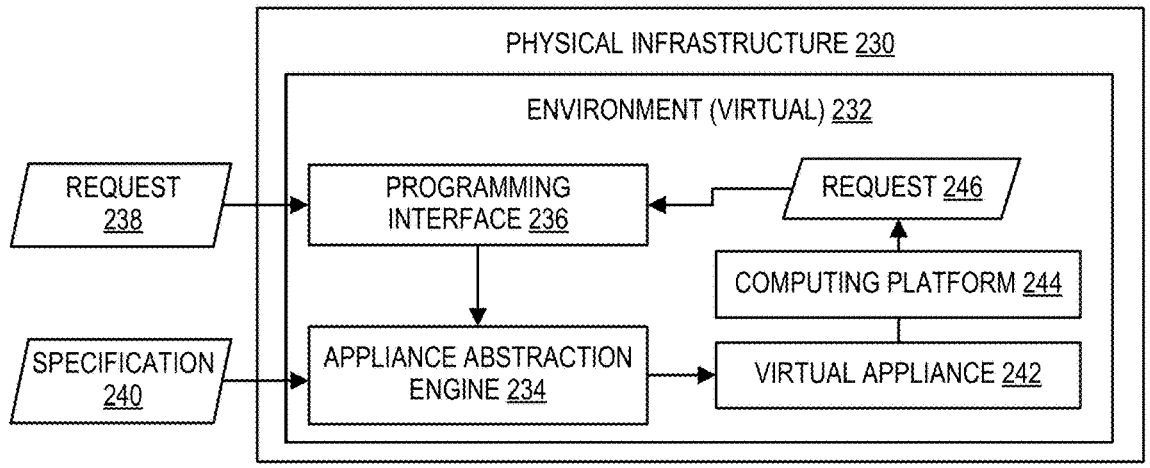
FIG. 2B is a block diagram depicting an example system that creates a virtual appliance in a virtual infrastructure type of environment.
Figure 2C:
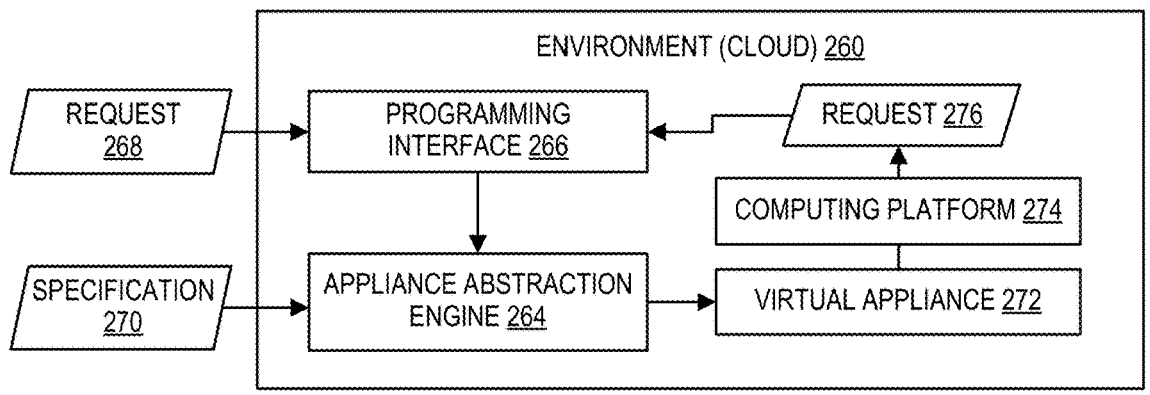
FIG. 2C is a block diagram depicting an example system that creates a virtual appliance in a cloud infrastructure type of environment.

FIGS. 2A, 2B, 2C depict example systems that create virtual appliances in a physical infrastructure type of environment, a virtual infrastructure type of environment, and a cloud infrastructure type of environment, respectively. The systems may be analogous in many respects to the system described in FIG. 1 wherein the appliance abstraction engine 104 creates virtual appliance 112 on the computing environment 100. For example, instances of the same appliance abstraction engine 104 may be implemented in each of the environments 200, 232, and 260 of FIGS. 2A, 2B, 2C respectively, thus enabling automation and simplicity in abstracting different infrastructure types. Each of FIGS. 2A, 2B, 2C will now be described in turn.

FIG. 2A depicts a computing environment 200 that is physical infrastructure. For example, the physical infrastructure environment 200 includes a bare metal server and/or other physical data center equipment (e.g., a switch). An appliance abstraction engine 204 is deployed to and running on the environment 200 and may be similar in many respects to the appliance abstraction engine 104 described above. For example, the appliance abstraction engine 204 may be called through a programming interface 206 (e.g., an API) to provide undifferentiated resources of the environment 200 by way of a virtual appliance. For example, an external request 208 may be a call to the programming interface 206.

In response to a call, the appliance abstraction engine 204 may receive 204-A a specification 210 defining capabilities of the virtual appliance and defines the computing platform (s) to be executed on the virtual appliance. The specification 210 may be retrieved from a repository, such as in a case where the request 208 is a call for a predefined virtual appliance configuration. In some examples, the specification 210 may be passed with the request 208.

The appliance abstraction engine 204 discovers 204-B available resources of the computing environment 200. Similar to the appliance abstraction engine 104, the appliance abstraction engine 204 may be equipped to discover resources of any type of infrastructure in some implementations. Having been instructed upon initialization that the appliance abstraction engine 204 is in a physical environment, the appliance abstraction engine 204 may utilize its discovery tools for a physical environment, such as message gathering on a management network of the computing environment 200 (e.g., messages based on server power on events, etc.). Because the environment 200 is physical infrastructure, the discovered resources may be described at a low level, in terms of firmware and hardware details, such as the identification of hosts, drives, network switches, ports, uplinks/downlinks, etc.

The appliance abstraction engine 204 creates 204-C a virtual appliance 212 according to the specification 210 and using the discovered available resources. For example, the appliance abstraction engine 204 may configure compute, storage, and networking resources of the environment 200. In particular, the appliance abstraction engine 204 may ensure minimum firmware levels (i.e., a firmware baseline) are available and perform a firmware update using a corresponding update mechanism if appropriate, may initialize a network fabric and ensure an available bandwidth, and may initialize a storage protocol, all according to the specification 210 capabilities. In an implementation, the appliance abstraction engine 204 may create and configure an overlay network. The appliance abstraction engine 204 then populates the virtual appliance 212 with artifacts to be used to stand up the computing platform 214.

Once the computing platform 214 is running on the virtual appliance 212, the computing platform 214 may further submit specific requests 216 (e.g., API calls) to the programming interface 206 to modify the virtual appliance 212. For example, the computing platform 214 may request additional resources of the environment 200 to be allocated to the virtual appliance 212.

FIG. 2B depicts a computing environment 230 that is virtual infrastructure. For example, the virtual infrastructure environment 232 may include a hypervisor executing on physical infrastructure 230 (e.g., a type-1 hypervisor, such as VMware ESXi, on a bare metal server) that can create and run virtual machines. An appliance abstraction engine 234 may be deployed to the virtual environment 232 (e.g., in a virtual machine or in a container) and may be similar in many respects to the appliance abstraction engine 104 or 204 described above.

The appliance abstraction engine 234 may be called by a request 238 via a programming interface 236 to access the undifferentiated resources of the virtual infrastructure type environment 232 by way of a virtual appliance. The appliance abstraction engine 234 may receive or retrieve the specification 240, which may be similar to specification 210 and may define capabilities of and a platform for the virtual appliance. The appliance abstraction engine 234, having been instructed upon initialization that it is on virtual infrastructure, may utilize its virtual infrastructure discovery tools to discover the available resources of the computing environment 232 and may keep an inventory of the available resources. For example, the appliance abstraction engine 234 may interrogate a virtual machine controller (e.g., vCenter for an ESXi hypervisor) of the environment 232 to determine the scope and configuration (e.g., compute and memory resources, network fabric, storage array layout, cluster configuration, etc.) of the environment 232.

The appliance abstraction engine 234 may create a virtual appliance 242 in accordance with the specification 240, by interfacing with and controlling the aforementioned virtual machine controller for example. For example, the appliance abstraction engine 234 may provision a virtual machine, bootstrap the specification capabilities (e.g., initializing the network fabric, provisioning storage such as iSCSI-attached disk, etc.), and/or populate computing platform artifacts to the virtual machine controller repositories). Once the computing platform 244 is running on the virtual appliance 242, the computing platform 244 itself may make specific calls (request 246) to the programming interface 236 to modify the resources allocated to the virtual appliance 242.

FIG. 2C depicts a computing environment 260 that is cloud infrastructure. For example, the computing environment 260 may be a public cloud (e.g., Amazon Web Services Cloud, Microsoft Azure, Google Cloud Platform, etc.). In other examples, the computing environment 260 may include other types of cloud environments, such as a private cloud, a hybrid cloud, a multi-cloud, a community cloud, a distributed cloud, etc.

An appliance abstraction engine 264 may be deployed to the cloud infrastructure environment 260 and may be similar in many respects to the appliance abstraction engine 104, 204, 234 described above. The appliance abstraction engine 264 may be called by a request 268 via a programming interface 266 to access the undifferentiated resources of the cloud infrastructure environment 260 by way of a virtual appliance. The appliance abstraction engine 264 may receive or retrieve the specification 270, which may be similar to specification 210, and may define capabilities of and a platform for the virtual appliance. The appliance abstraction engine 264, having been instructed upon initialization that it is on cloud infrastructure, may utilize its cloud infrastructure discovery tools to discover the available resources of the computing environment 260 and may keep an inventory of the available resources. For example, the appliance abstraction engine 264 may discover available resources by querying cloud APIs of the computing environment 260 to determine a quota of deployment space of the cloud environment 260, for a given account.

The appliance abstraction engine 264 may create a virtual appliance 272 in accordance with the specification 270, which may include reserving from inventory a portion of the cloud resources, initializing private networks using cloud APIs, and populating computing platform artifacts into cloud image repositories of the environment 260 using cloud APIs. In some implementations, the appliance abstraction engine 264 may utilize a basic subset of available cloud APIs to achieve the resource envelope of the virtual appliance 272, to achieve a high level of compatibility and/or extensibility among clouds. Once the computing platform 274 is running on the virtual appliance 272, the computing platform 274 itself may make specific calls (request 276) to the programming interface 266 to modify the resources allocated to the virtual appliance 272.

In some implementations, homogenous or heterogeneous combinations of the foregoing example environments 200, 232, 260 may be interconnected, such as by a network. The computing platforms and virtual appliances of such combinations of environments may form a network of cooperative nodes, such as a cluster. In some examples, a self-assembling system may build out a cluster across multiple virtual appliances.

Figure 3:
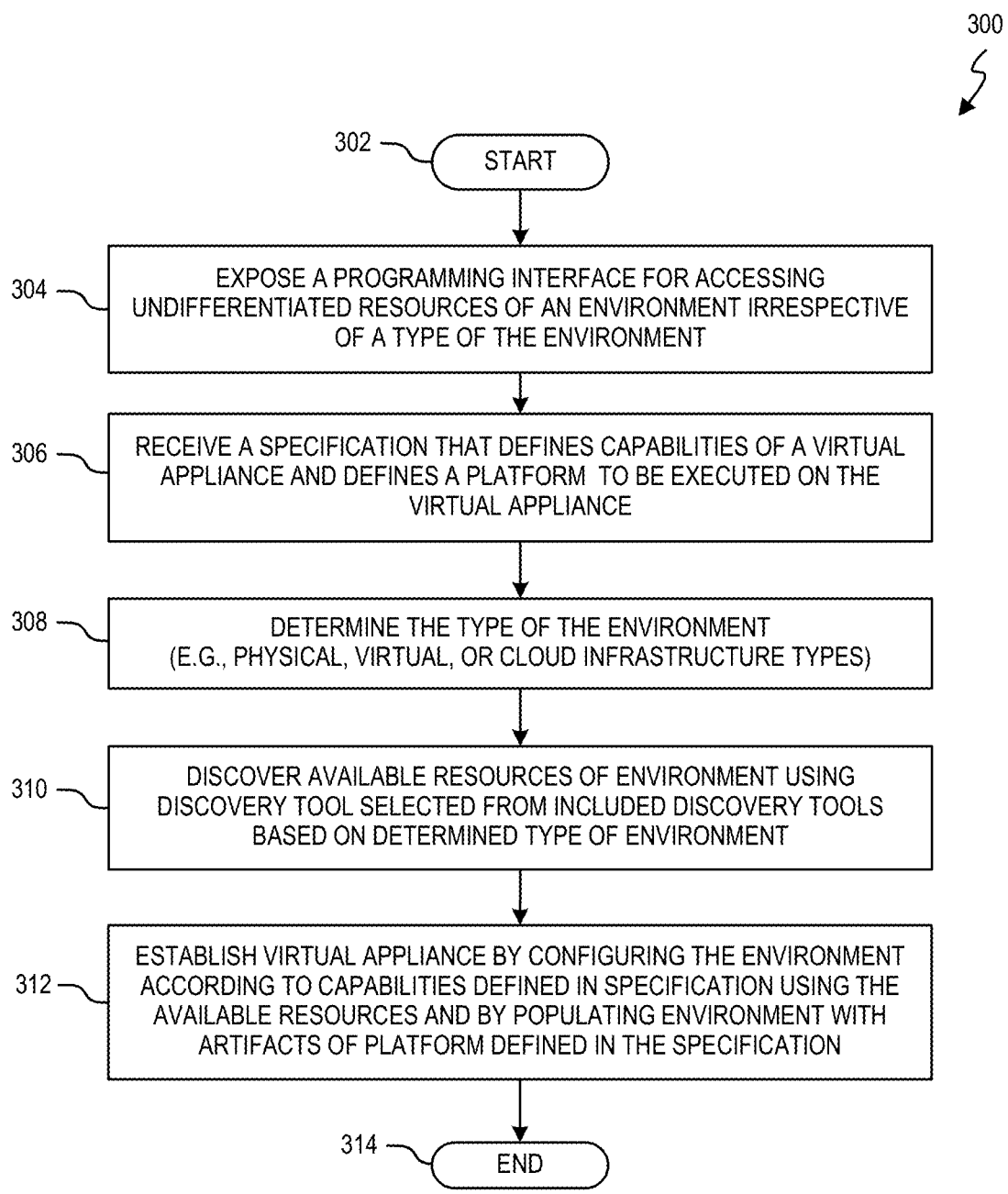
FIG. 3 is a flow diagram depicting an example method to establish a virtual appliance.
Figure 4:
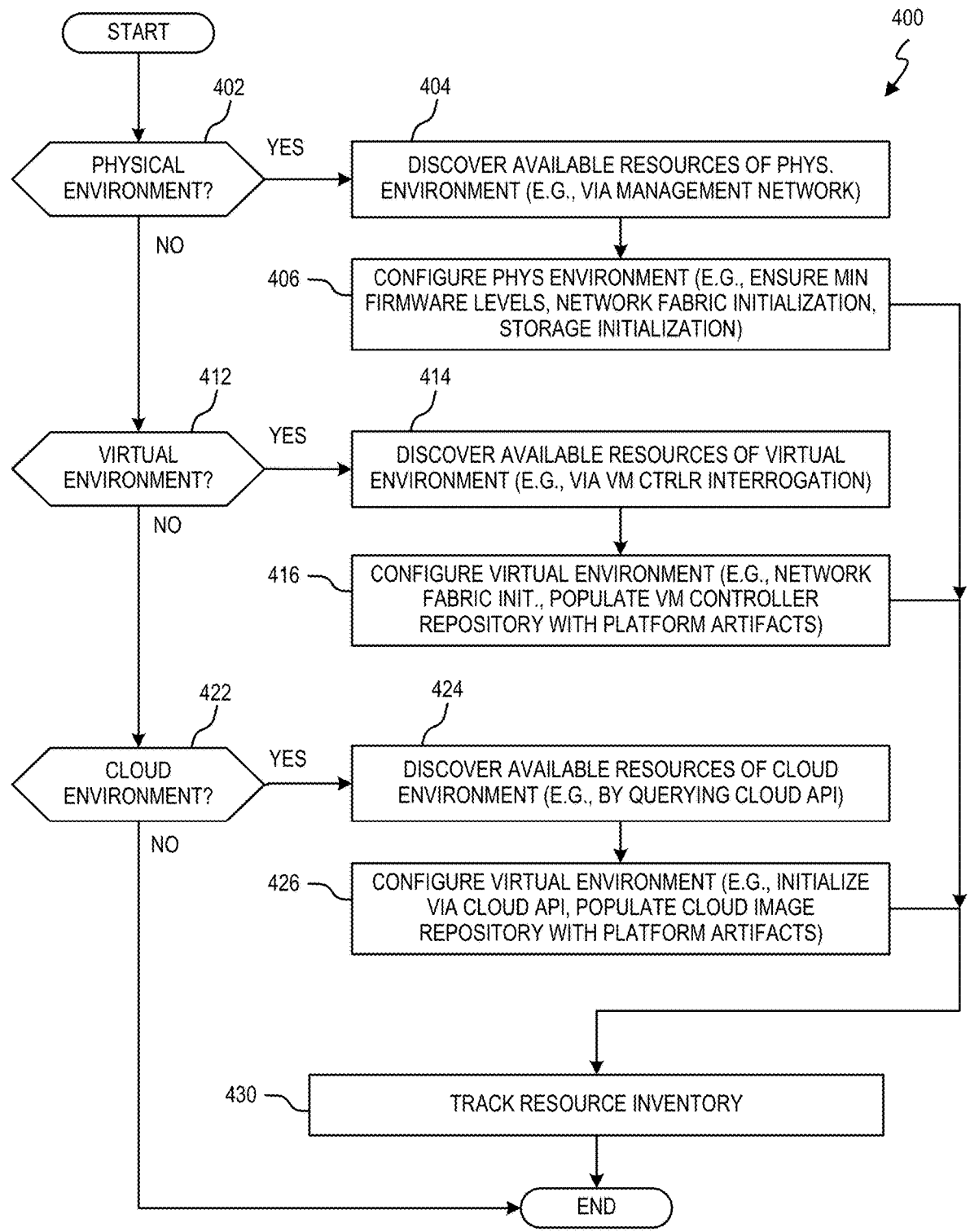
FIG. 4 is a flow diagram depicting an example method to establish a virtual appliance in a physical, virtual, or cloud types of environment.

FIGS. 3 and 4 are flow diagrams depicting various example methods. In some implementations, one or more blocks of a method may be executed substantially concurrently or in a different order than shown. In some implementations, a method may include more or fewer blocks than are shown. In some implementations, one or more of the blocks of a method may, at certain times, be ongoing and/or may repeat.

The methods may be implemented in the form of executable instructions stored on a machine readable medium and executed by a processing resource and/or in the form of electronic circuitry. For example, the methods below are described as being performed in part or in whole by an appliance abstraction engine, such as the appliance abstraction engines 104, 204, 234, 364 described above. The appliance abstraction engine may be resident on a computing environment, such as the computing environments 100, 200, 232, 260 described above.

FIG. 3 is a flow diagram depicting an example method 300. Method 300 begins at block 302 and continues to block 304, where a processor-based appliance abstraction engine deployed to a computing environment exposes a programming interface for accessing undifferentiated resources of the environment irrespective of a type of the environment. For example, the type of the environment may be physical, virtual, or cloud infrastructure. The appliance abstraction engine may be called via the programming interface by a caller (e.g., an application, script, etc.) to access resources for standing up a desired computing platform.

At block 306, the appliance abstraction engine receives a specification that defines capabilities of a virtual appliance and defines a platform to be executed on the virtual appliance. The virtual appliance provides the undifferentiated resources for standing up the platform. For example, the platform may be a cluster management platform, a container management platform, a storage management platform, or other computing platforms.

At block 308, the appliance abstraction engine determines the type of the environment: physical infrastructure, virtual infrastructure, or cloud infrastructure. For example, the appliance abstraction engine may have received an indication of the type of environment upon being initialized in a first instance. In some implementations, other types of infrastructure may serve as the environment.

At block 310, the appliance abstraction engine discovers available resources of the environment using a discovery tool selected from a plurality of discovery tools based on the type of the environment. In some implementations, the plurality of discovery tools are included in the appliance abstraction engine and are to discover available resources of physical, virtual, and cloud infrastructure types of environment.

At block 312, the appliance abstraction engine establishes a virtual appliance by configuring the environment according to the capabilities defined in the specification using the available resources discovered at block 310 and by populating the environment with artifacts associated with the platform defined in the specification. Method 300 ends at block 314.

FIG. 4 is a flow diagram depicting an example method 400 to establish a virtual appliance in a physical, virtual, or cloud types of environment. Method 400 may be an example implementation of blocks 310, 312 of method 300 described above.

After the programming interface of an appliance abstraction engine has been called and a specification has been received, the appliance abstraction engine determines whether it is deployed in a physical infrastructure, virtual infrastructure, or cloud infrastructure type of computing environment. Although a series of decision blocks 402, 412, 422 are illustrated in FIG. 4 for determining whether the environment is physical (402), virtual (412), or cloud (422) infrastructure, other decision techniques can be used.

In some implementations, the appliance abstraction engine is initialized in the computing environment in the first instance (i.e., before receiving a call to the programming interface) with an indication of the type of the environment, and the appliance abstraction engine can check the indication at blocks 402, 412, 422. For example, a user deploying the appliance abstraction engine may manually provide the indication in a configuration file or the like.

If the environment is physical infrastructure ("YES" at block 402), the appliance abstraction engine proceeds to discover, at block 404, resources of the physical infrastructure environment using message gathering on a management network of the environment and tracks the discovered resources in an inventory. In some implementations, other types of physical infrastructure interrogation techniques may be used, in addition or in the alternative. Then, at block 406, the appliance abstraction engine configures the physical infrastructure environment by, for example, verifying that the environment meets minimum firmware levels defined in the specification, initializing the network fabric, and/or initializing storage. The appliance abstraction engine may also populate the physical environment with platform artifacts, per the specification.

If the environment is virtual infrastructure ("YES" at block 412), the appliance abstraction engine proceeds to discover, at block 414, resources of the virtual infrastructure environment by interrogating a virtual machine controller of the environment and tracks the discovered resources in an inventory. Then, at block 416, the appliance abstraction engine configures the virtual infrastructure environment by, for example, requesting a virtual machine according to the capabilities defined in the specification (e.g., compute, memory, network, storage capabilities), initializing a network fabric, and/or other initializations defined in the specification. The appliance abstraction engine may also populate the virtual machine controller repository with artifacts for the platform defined in the specification.

If the environment is cloud infrastructure ("YES" at block 422), the appliance abstraction engine proceeds to discover, at block 424, resources of the cloud infrastructure environment by querying a deployment quota using a cloud API of the environment and tracks the discovered resources in an inventory. Other quotas or the like may also be queried, depending on available cloud APIs. Then, at block 426, the appliance abstraction engine configures the cloud infrastructure environment by, for example, initializing and allocating a portion of the cloud infrastructure for the virtual appliance according to the capabilities defined in the specification (e.g., compute, memory, network, storage capabilities). The appliance abstraction engine may also populate the cloud image repository with artifacts for the platform defined in the specification.

At block 430, the appliance abstraction engine may update the resource inventory, after having allocated resources to the virtual appliance created by execution of blocks 406, 416, or 426. If the appliance abstraction engine does not have sufficient resources in the inventory to set up a virtual appliance at any of blocks 406, 416, 426 above, the appliance abstraction engine may pass an error message back to the caller.

Figure 5:
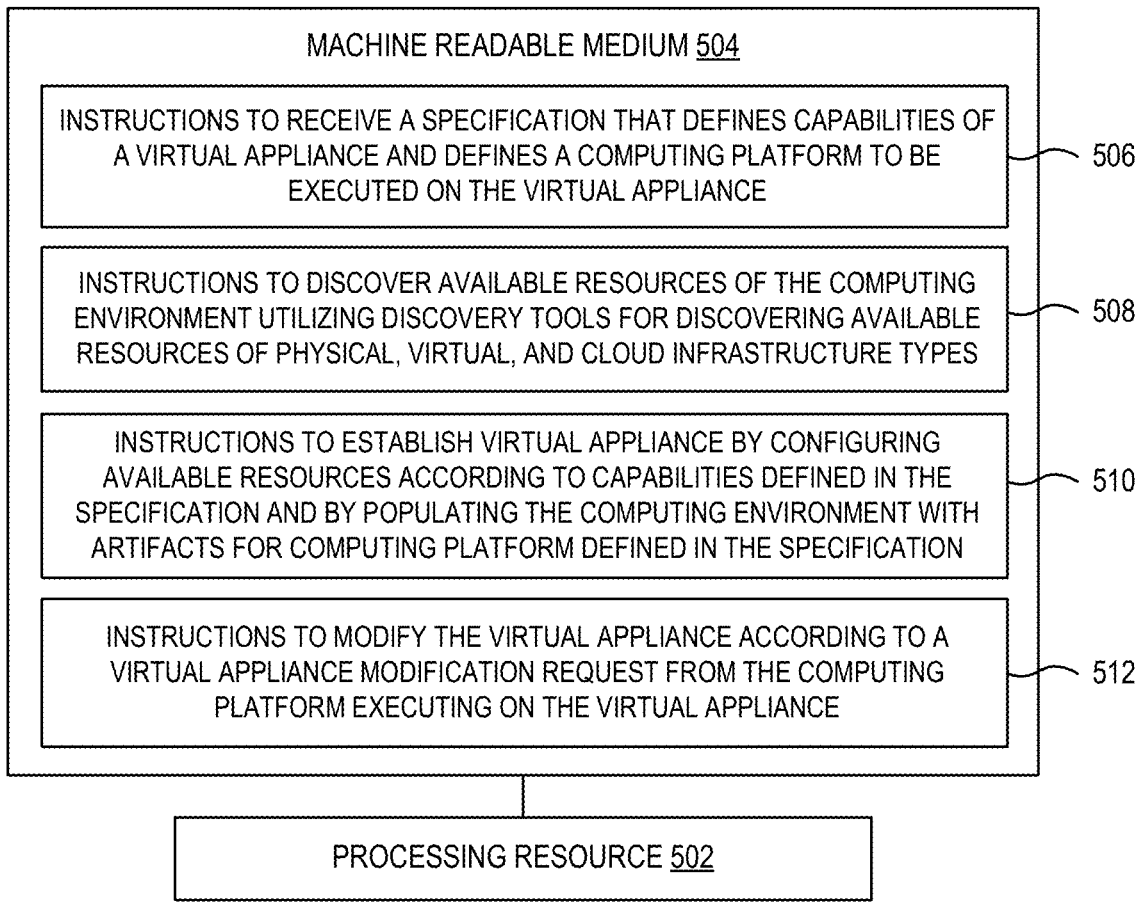
FIG. 5 is a block diagram depicting a non-transitory, machine readable medium encoded with example instructions to establish and modify a virtual appliance.

FIG. 5 depicts a processing resource 502 coupled to a non-transitory, machine readable medium 504 encoded with example instructions. The processing resource 502 may include a microcontroller, a microprocessor, central processing unit core(s), an ASIC, an FPGA, and/or other hardware device suitable for retrieval and/or execution of instructions from the machine readable medium 504 to perform functions related to various examples. Additionally or alternatively, the processing resource 502 may include electronic circuitry for performing the functionality of the instructions described herein.

The machine readable medium 504 may be any medium suitable for storing executable instructions, such as RAM, ROM, EEPROM, flash memory, a hard disk drive, an optical disc, or the like. The machine readable medium 504 may be disposed within a system (e.g., a server or the like), in which case the executable instructions may be deemed "installed" on or "embedded" in the system. Alternatively, the machine readable medium 504 may be a portable (e.g., external) storage medium, and may be part of an "installation package."

As described further herein below, the machine readable medium 504 may be encoded with a set of executable instructions 506, 508, 510, 512. It should be understood that part or all of the executable instructions and/or electronic circuits included within one box may, in alternate implementations, be included in a different box shown in the figures or in a different box not shown. In some examples, the instructions 506, 508, 510, 512 may be used to implement the appliance abstraction engine 104 described above.

In some implementations, the processing resource 502 and the machine readable medium 504 may be associated with a computing environment. For example, the processing resource 502 and machine readable medium 504 may be the hardware underlying physical infrastructure (e.g., a bare metal server), virtual infrastructure (e.g., a hypervisor-based environment running on a bare metal server), or cloud infrastructure (e.g., a cloud platform running on a bare metal or virtualized server).

Instructions 506, when executed, cause the processing resource 502 to receive a specification that defines capabilities (i.e., a resource envelope) of a virtual appliance and defines a computing platform to be executed on the virtual appliance. Instructions 508, when executed, cause the processing resource 502 to discover available resources of a computing environment utilizing discovery tools for discovering available resources of physical, virtual, and cloud infrastructure types. For example, the discovery tools may include message gathering on a management network for physical infrastructure, interrogation of a virtual machine controller for virtual infrastructure, and querying cloud application programming interfaces of cloud infrastructure to determine deployment quotas. In some implementations, all discovery tools to discover available resources of physical, virtual, and cloud infrastructure types are included in the instructions 508. Instructions 508 may record discovered available resources in an inventory. Instructions 508 may be executed periodically or at other times to update the inventory.

Instructions 510, when executed, cause the processing resource 502 to establish a virtual appliance on the computing environment by configuring the discovered available resources of the computing environment according to the capabilities defined in the specification and by populating the computing environment with artifacts for the computing platform defined in the specification.

Instructions 512, when executed, cause the processing resource 502 to modify the virtual appliance according to a virtual appliance modification request from the computing platform executing on the virtual appliance. For example, the platform may seek additional or different resources to be added to the virtual appliance.

In some implementations, other instructions may be included on medium 504. Some example instructions, when executed, cause the processing resource 502 to provide artifact updates to the virtual appliance. Other example instructions, when executed, cause the processing resource 502 to scrub virtual appliances to determine whether any virtual appliances are no longer in use and the resources thereof can be released back into inventory.

In the foregoing description, numerous details are set forth to provide an understanding of the subject matter disclosed herein. However, implementation may be practiced without some or all of these details. Other implementations may include modifications and variations from the details discussed above. It is intended that the following claims cover such modifications and variations.

What is claimed:
1. A system comprising:
    a computing environment of a type that is physical infrastructure, virtual infrastructure, or cloud infrastructure; and an appliance abstraction engine deployed on the computing environment, the appliance abstraction engine to:
  expose a programming interface for accessing undifferentiated resources of the computing environment irrespective of and without knowledge of the type of the computing environment,
  receive an indication of the type of the computing environment upon initialization of the appliance abstraction engine,
  receive from a caller and via the programming interface an initial request for undifferentiated resources of the computing environment as a virtual appliance, the initial request not including any knowledge of the type of computing environment,
  receive directly by the appliance abstraction engine a specification that defines capabilities for the virtual appliance and defines a computing platform to be executed on the virtual appliance,
  discover available resources of the computing environment utilizing discovery tools included in the appliance abstraction engine for discovering available resources of physical, virtual, and cloud infrastructure types, where physical infrastructure type includes bare metal servers, virtual infrastructure type includes a hypervisor executing on physical infrastructure, and cloud infrastructure type includes a public cloud service, and
  in response to the initial request, create the virtual appliance by configuring the discovered available resources of the computing environment according to the capabilities defined in the specification and by populating the computing environment with artifacts for the computing platform defined in the specification, wherein the virtual appliance as created appears identical to the caller regardless of the type of the computing environment.

2. The system of claim 1, wherein the appliance abstraction engine is to modify the virtual appliance according to a modification request from the computing platform that is executing on the virtual appliance.

3. The system of claim 1, wherein the computing environment is physical infrastructure, and
  the appliance abstraction engine is to discover available resources of the computing environment by message gathering on a management network of the computing environment, including gathering messages based on server power on events, wherein the discovered available resources are described at hardware and firmware levels.

4. The system of claim 1, wherein the computing environment is virtual infrastructure, and
  the appliance abstraction engine is to discover available resources of the computing environment by interrogating a virtual machine controller.

5. The system of claim 1, wherein the computing environment is cloud infrastructure, and
  the appliance abstraction engine is to discover available resources of the computing environment by querying cloud application programming interfaces of the computing environment to determine a deployment quota.

6. The system of claim 1, wherein at least one of the capabilities defined in the specification relate to network fabric initialization parameters.

7. The system of claim 1, wherein at least one of the capabilities defined in the specification relate to minimum firmware levels.

8. The system of claim 1, wherein at least one of the capabilities defined in the specification relate to storage initialization parameters.

9. The system of claim 8, wherein the storage initialization parameters include high availability parameters.

10. The system of claim 1, wherein the computing platform is a cluster management platform, a container management platform, or a storage management platform.

11. A method comprising:
  exposing, by a processor-based appliance abstraction engine deployed to a computing environment, a programming interface for accessing undifferentiated resources of the computing environment irrespective of and without knowledge of a type of the computing environment;
  receiving, by the appliance abstraction engine, an indication of the type of computing environment upon initialization of the appliance abstraction engine;
  receiving, by the appliance abstraction engine via the programming interface, an initial request from a caller for undifferentiated resources of the computing environment as a virtual appliance, the initial request not including any knowledge of the type of computing environment;
  receiving, by the appliance abstraction engine directly, a specification that defines capabilities for the virtual appliance and defines a platform to be executed on the virtual appliance;
  determining, by the appliance abstraction engine, the type of the computing environment, wherein the type includes physical, virtual, or cloud infrastructure types;
  discovering, by the appliance abstraction engine, available resources of the computing environment using a discovery tool selected from a plurality of discovery tools based on the determined type of the computing environment, wherein the plurality of discovery tools are included in the appliance abstraction engine and are to discover available resources of physical, virtual, and cloud infrastructure types of computing environment, and wherein physical infrastructure type includes bare metal servers, virtual infrastructure type includes a hypervisor executing on physical infrastructure, and cloud infrastructure type includes a public cloud service; and
  establishing, by the appliance abstraction engine and in response to the initial request, the virtual appliance by configuring the computing environment according to the capabilities defined in the specification using the available resources and by populating the computing environment with artifacts associated with the platform defined in the specification, wherein the virtual appliance as established appears identical to the caller regardless of the type of the computing environment.

12. The method of claim 11, wherein the computing environment is physical infrastructure, and
  the discovering includes message gathering on a management network of the computing environment, including gathering messages based on server power on events.

13. The method of claim 11, wherein the computing environment is virtual infrastructure, and
  the discovering includes interrogating a virtual machine controller of the computing environment.

14. The method of claim 11, wherein the computing environment is cloud infrastructure, and
  the discovering includes querying cloud application programming interfaces of the computing environment to determine a deployment quota.

15. The method of claim 11, wherein at least one of the capabilities defined in the specification relate to network fabric initialization parameters, and
   the configuring the computing environment includes initializing a network fabric of the environment according to the network fabric initialization parameters.

16. The method of claim 11, wherein at least one of the capabilities defined in the specification relate to minimum firmware levels, and
   the configuring the computing environment includes determining whether the environment meets the minimum firmware levels.

17. The method of claim 11, wherein at least one of the capabilities defined in the specification relate to storage initialization parameters.

18. The method of claim 11, wherein the platform is a cluster management platform, a container management platform, or a storage management platform.

19. A non-transitory machine readable medium storing instructions of an appliance abstraction engine executable by a processing resource of a computing environment, the non-transitory machine readable medium comprising:
   instructions to receive an indication of a type of the computing environment upon initialization of the appliance abstraction engine;
   instructions to receive via a programming interface exposed by the appliance abstraction engine an initial request from a caller for undifferentiated resources of the computing environment as a virtual appliance, the initial request not including any knowledge of the type of computing environment;
   instructions to receive directly at the appliance abstraction engine a specification that defines capabilities for the virtual appliance and defines a computing platform to be executed on the virtual appliance;
   instructions to discover available resources of the computing environment utilizing discovery tools for discovering available resources of physical, virtual, and cloud infrastructure types, where physical infrastructure type includes bare metal servers, virtual infrastructure type includes a hypervisor executing on physical infrastructure, and cloud infrastructure type includes a public cloud service;
   instructions to establish, in response to the initial request, the virtual appliance by configuring the discovered available resources of the computing environment according to the capabilities defined in the specification and by populating the computing environment with artifacts for the computing platform defined in the specification, wherein the virtual appliance as established appears identical to the caller regardless of the type of the computing environment; and
   instructions to modify the virtual appliance according to a virtual appliance modification request from the computing platform executing on the virtual appliance.

20. The non-transitory machine readable medium of claim 19, wherein the discovery tools include message gathering on a management network for physical infrastructure types including messages based on server power on events, interrogation of a virtual machine controller for virtual infrastructure types, and querying cloud application programming interfaces of cloud infrastructure types to determine deployment quotas.

21. The non-transitory machine readable medium of claim 19 further comprising instructions to provide updates to the artifacts to the virtual appliance.

22. The non-transitory machine readable medium of claim 19 further comprising:
   instructions to maintain an inventory that tracks available resources discovered by the instructions to discover and resources allocated to the virtual appliance by the instructions to establish the virtual appliance;
   instructions to periodically scrub the inventory to identify resources allocated to the virtual appliance that are no longer in use by the virtual appliance or the computing platform executing on the virtual appliance; and
   instructions to release identified resources no longer in use scrub back to the available resources tracked in the inventory.

23. The non-transitory machine readable medium of claim 19 wherein the instructions to establish the virtual appliance by configuring the discovered available resources of the computing environment includes:
   instructions to, if the computing environment is the physical infrastructure type, update firmware of the computing environment to a firmware baseline and initialize a network fabric or a storage protocol;
   instructions to, if the computing environment is the virtual infrastructure type, interface with a virtual machine controller of the computing environment to bootstrap the capabilities of the specification; and
   instructions to, if the computing environment is the cloud infrastructure type, using cloud APIs of the computing environment to reserve cloud resources of the computing environment and initialize private networks from the computing environment.

\* \* \* \* \*